United States Patent [19]

Mallary et al.

[11] Patent Number: 5,724,212
[45] Date of Patent: Mar. 3, 1998

[54] METHOD AND APPARATUS FOR INCREASING DATA DENSITY IN MAGNETIC DATA STORAGE DISK DRIVES

[75] Inventors: Michael L. Mallary, Berlin; Peter T. Griffin, Shrewsbury, both of Mass.

[73] Assignee: Quantum Corporation, Milpitas, Calif.

[21] Appl. No.: 452,225

[22] Filed: May 26, 1995

[51] Int. Cl.$^6$ ............................ G11B 5/55; G11B 21/08; G11B 20/20
[52] U.S. Cl. ...................... 360/106; 360/103; 360/76
[58] Field of Search ........................ 360/103–104, 360/106, 75–76

[56] References Cited

U.S. PATENT DOCUMENTS

| | | | |
|---|---|---|---|
| 3,821,813 | 6/1974 | Freeman | 360/103 |
| 4,218,715 | 8/1980 | Garnier | 360/103 |
| 4,334,252 | 6/1982 | Toriu | 360/104 |
| 4,644,641 | 2/1987 | Verdone | 29/630 |
| 4,700,248 | 10/1987 | Coughlin | 360/103 |
| 4,734,803 | 3/1988 | Nishihara | 360/103 |
| 4,945,427 | 7/1990 | Cunningham | 360/75 |
| 5,097,370 | 3/1992 | Hsia | 360/103 |
| 5,212,608 | 5/1993 | Yoneoka | 360/103 |
| 5,218,494 | 6/1993 | Chapin | 360/103 |
| 5,229,903 | 7/1993 | Hayakawa | 360/121 |
| 5,287,235 | 2/1994 | Cunningham | 360/103 |
| 5,396,386 | 3/1995 | Bolasna et al. | 360/103 |

*Primary Examiner*—John H. Wolff
*Assistant Examiner*—Brian E. Miller
*Attorney, Agent, or Firm*—John C. Chen

[57] ABSTRACT

A method and apparatus for increasing recording density in zone bit recording on a magnetic recording disk without increasing track density by maximizing the data density the at disk's outer track. A magnetic recording head is attached to a parallelogram shaped slider such that the head's gap-to-radius skew and the slider rail skew changes continuously as the slider moves in an arcuate path from the disk's inner track to the disk's outer track. The parallelogram slider is designed to reduce the loss of data density at the outer track by minimizing the head's gap-to-radius skew while maximizing the rail skew angle at the outer track to maintain an essentially constant low fly height across the disk.

15 Claims, 4 Drawing Sheets

$W' = W\cos\theta$
$S' = \dfrac{S}{\cos\theta}$

5,724,212

METHOD AND APPARATUS FOR INCREASING DATA DENSITY IN MAGNETIC DATA STORAGE DISK DRIVES

FIELD OF THE INVENTION

The present invention relates to the field of magnetic disk drives. More particularly, the present invention relates to a method of transducing data onto a rotating disk surface using a transducer-slider structure which increases recording density and also relates to a read/write transducer and slider structure designed to increase recording density.

BACKGROUND OF THE INVENTION

Computer systems employ a number of storage devices to store data. One of these storage devices is a disk drive. A disk drive includes one or more magnetic storage disks mounted on a spindle and spaced apart so that the separate disks do not touch each other.

The surface of each disk is divided into portions, known as tracks, where data is stored. The tracks are arranged in concentric circles. In zone bit recording, a data storage disk is subdivided into a set of concentric bands of data tracks. Each zone of recording tracks is provided with a data rate which is adapted to the radius of the particular recording zone. In this method, a substantially constant data rate is maintained within each radial disk zone. Each zone's data rate is chosen such that the storage capacity is maximized at the inner track of each zone.

Currently, magnetic data storage disks are formed of precisely formed aluminum alloy, glass or ceramic substrates upon which magnetic media layers and protective overcoat layers are deposited as thin films by sputtering techniques.

Information is stored onto the magnetic data storage disks in the form of transitions in magnetic flux on the magnetic surface of the disk. An electromagnetic transducer, also known as a read/write head is typically contained at a trailing edge of a ceramic slider structure, which flies upon an air cushion or bearing directly above (e.g. 1–5 micro inches) a magnetic recording disk. The read/write head is usually formed from two or more elongated pole pieces of a suitable ferromagnetic material such as a nickel iron (NiFe) alloy and a wire coil. At one s end, the pole pieces are touching and at the other end there is a slight gap between the pole pieces. The head is positioned so that the gap is directed towards the disk surface. When electric current is impressed on the coil, a magnetic flux is generated, which is impressed upon the pole pieces. At the gap, the magnetic flux is directed through the magnetic material in the adjacent disk surface, impressing an area of the track with magnetic flux to represent data.

The transducer-slider structure is positioned over the data storage surface by a head positioner actuator, such as a rotary voice coil actuator positioner. The actuator positioner includes a head-gimbal assembly which enables the transducer-slider assembly structure to manifest pitch and roll characteristics, while being maintained precisely in position radially relative to the rotating disk surface. The actuator rapidly displaces the transducer-slider structure from a departure track to a destination track during track seeking operations; and it maintains the transducer-slider structure in registration with the destination track during subsequent data writing or reading operations. These positioning operations are controlled in large part by transducer position information read by the transducer as it passes over each embedded servo sector within each data track.

The conventional design for a hard disk drive slider utilizes a two rail, taper flat air bearing which is created by machining a slider row bar. This slider design and row bar machining process has been available for a number of years. One example of a conventional two-rail slider in accordance with contemporary prior art techniques is described in U.S. Pat. No. 4,928,195 entitled "Improved Floating Magnetic Head for High Density Recording".

When the disk rotates, air is dragged between the rails and the disk surface causing pressure, which forces the head away from the disk. The head is thus said to fly over the rotating disk at a "fly height". This method of recording, where the head flies in close proximity to the rotating disk surface on an air bearing is known as "non-contact recording".

The disadvantage of most non-contact magnetic disk recording methods, is that the relative velocity between the head and disk is greater at the outer radius of the disk than at the inner radius. Thus the head has a tendency to fly higher at the outer radius where the relative velocity is greatest. Consequently, this method of recording produces a linear data density (bits per linear track unit length) that varies inversely with track radius. That is, within each zone, the data density at the inner radius track is greatest while the data density at the outer radius tracks has a tendency to be lower.

In the context of zone bit recording, the outer track of each zone tends to lose data storage capability. More detrimentally, the outermost tracks of a disk, which offer the most data storage capacity, tends to be under utilized, drastically reducing total data storage capability of the disk.

One method of maintaining a constant low fly height across the disk, is to severely skew the angle of the slider rails at the outer diameter. This known method reduces the inverse relationship between radius and data density.

FIG. 1 shows a typical prior art conventional rectangular shaped two rail slider 10 wherein the flying rails 13 are essentially parallel to line 21, which is tangent to the innermost track 20 and severely skewed by an angle θ, from tangent line 21', at the outermost track 30. However, using a conventional rectangular shaped slider, with this design the skew angle of the head gap is coupled with the skew angle of the rails, that is, by skewing the rail angle, the head gap is effectively skewed as a result. FIG. 1 illustrates this dependency wherein the gap 12 is essentially parallel to the disk radius at innermost track 20 and skewed by gap skew angle β, measured from the disk radius at the outermost track 30.

The high skew angles of the head gap to the track width direction have two detrimental effects on read/write performance. Both of these effects depend upon the cosine of the skew angle.

FIGS. 2a and 2b illustrate these detrimental effects. In FIG. 2a, G represents the projection of the gap, having a width W, onto a track T when the head gap is not skewed. Note that G also represents an areal bit of storage. In this non-skewed orientation, a transition spacing, S, is defined by a perpendicular distance between the edges of a bit.

When the head gap is skewed by an angle θ, as illustrated in FIG. 2b, a effective track width, W', is reduced by the cosine of θ. As the head gap skew angle, θ, increases, the effective track width also decreases. Accordingly, since the amplitude for all frequencies decreases in direct proportion with track width, as is well known by those skilled in the art of magnetic recording, the first detrimental effect is that linear bit density of each track indirectly decreases because the loss in amplitude requires even larger transition spacing.

The second detrimental effect is further illustrated in FIG. 2b, using basic principles of trigonometry. FIG. 2b shows that a effective transition spacing, S', is increased by the inverse of cosine theta. Since transition spacing is the inverse of bit spacing, the head gap skew angle has a direct impact on increasing transition spacing and consequently on the loss of linear data density. In other words, as head gap skew angle increases, transition spacing also increases, thereby decreasing data density.

Since the linear data density of a disk is directly proportional to transition spacing and indirectly proportional to track width, it is critical to minimize the transition spacing at the outer track in order to maximize data density without increasing track density.

Various prior art methods have attempted to improve data density at the outer diameter track. One method is described in U.S. Pat. No. 4,945,427 ('427). This patent maximizes the head/media capacity by increasing the track density and decreasing the track widths at the outer radius tracks. To record onto the narrower tracks at the outer radius tracks, the '427 patent uses a parallelogram shaped slider/head arrangement whose gap is skewed in a progressively increasing manner, to the disk radius at the location of each track, from the inner to the outer track. Thus the track widths become progressively narrower as the head moves from the inner to the outermost track.

The disadvantage of '427 is that it practices constant frequency recording, which is a lesser preferred method of recording by those skilled in the art. Further, the head gap of the two rail slider described in '427 is skewed from a large angle, at the inner diameter track, to an even larger angle at the outer diameter track. In addition, complex disk drive functions must be provided to format the disks and incrementally advance the actuator arm from one narrow track to the next.

What is needed in the art of zone bit recording is a new and improved method of increasing recording density of magnetic disks by maximizing data density at the outer diameter tracks without increasing track density or using complex disk drive functions. The method should include an air bearing two rail slider having an essentially constant fly height across the disk.

SUMMARY OF THE INVENTION

Accordingly, a general object of the present invention is to provide a new and improved apparatus and method for zone bit magnetic recording in a manner which overcomes limitations and drawbacks of the prior art.

Another object of the present invention is to provide a new and improved method and apparatus for increasing recording density in zone bit magnetic recording using a parallelogram shaped slider designed to maintain an essentially constant fly height and maximize data density without increasing track density.

Another object of the present invention is to provide a new and improved apparatus and method for increasing magnetic recording density of the above mentioned kind without requiring a complex disk drive head positioner to incrementally advance the actuator arm through progressively narrower position increments, as the head moves from the inner to the outer track.

In accordance with the present invention, a parallelogram shaped air-bearing slider is provided such that its head gap skew changes from a counter clockwise (CCW) angle from the disk radius at the innermost track to a clockwise (CW) angle from the disk radius at the outermost track when the arm rotates in a CW direction, moving the slider from the innermost track to the outermost track. At a median track between the innermost and outermost track, the head gap is parallel with the disk radius. The gap skew angle is designed to minimize the detrimental effects of the cosine of the gap skew on track width, averaged over the disk surface. Therefore, areal data density is maximized without increasing track density.

In accordance with a feature of the present invention, the parallelogram shaped slider mounting is designed such that the flying rails are skewed progressively at an angle from the tangential velocity vector as the slider moves across the disk such that an essentially constant low fly height is maintained across the disk.

In accordance with a feature of the present invention, the parallelogram shaped slider is oriented such that the inside leading corner is located in advance of the outside leading corner at the inner track.

In accordance with a feature of the present invention, the parallelogram shaped slider is oriented such that the outside leading corner is located in advance of the inside leading corner at the outer track.

The invention will be described with reference to the recording of concentric data tracks. However, the invention also finds utility in other track formats, for example in the recording of a single continuous spiral track. Thus, the scope and content of the invention includes the recording of such other track formats.

These and other features and advantages of the present invention will be apparent to those skilled in the art upon reference to the following description of preferred embodiments thereof.

BRIEF DESCRIPTION OF THE DRAWING

In the Drawings:

FIG. 3a shows a top plan view of the disk of FIG. 3, illustrating the substantially constant track widths.

DETAILED DESCRIPTION OF A PREFERRED EMBODIMENT

The present invention finds utility in disk drives or files of many detailed configurations, including hard or rigid disk drives having various disk diameters.

The details of construction of disk drives in which the invention finds utility, including the fabrication of the parallelogram shaped slider, are well known to those skilled in the art. As a result the following description provides only such detail as is necessary to teach the best mode of the present invention, and is necessary to enable those skilled in the art to practice the invention.

Figure 1:
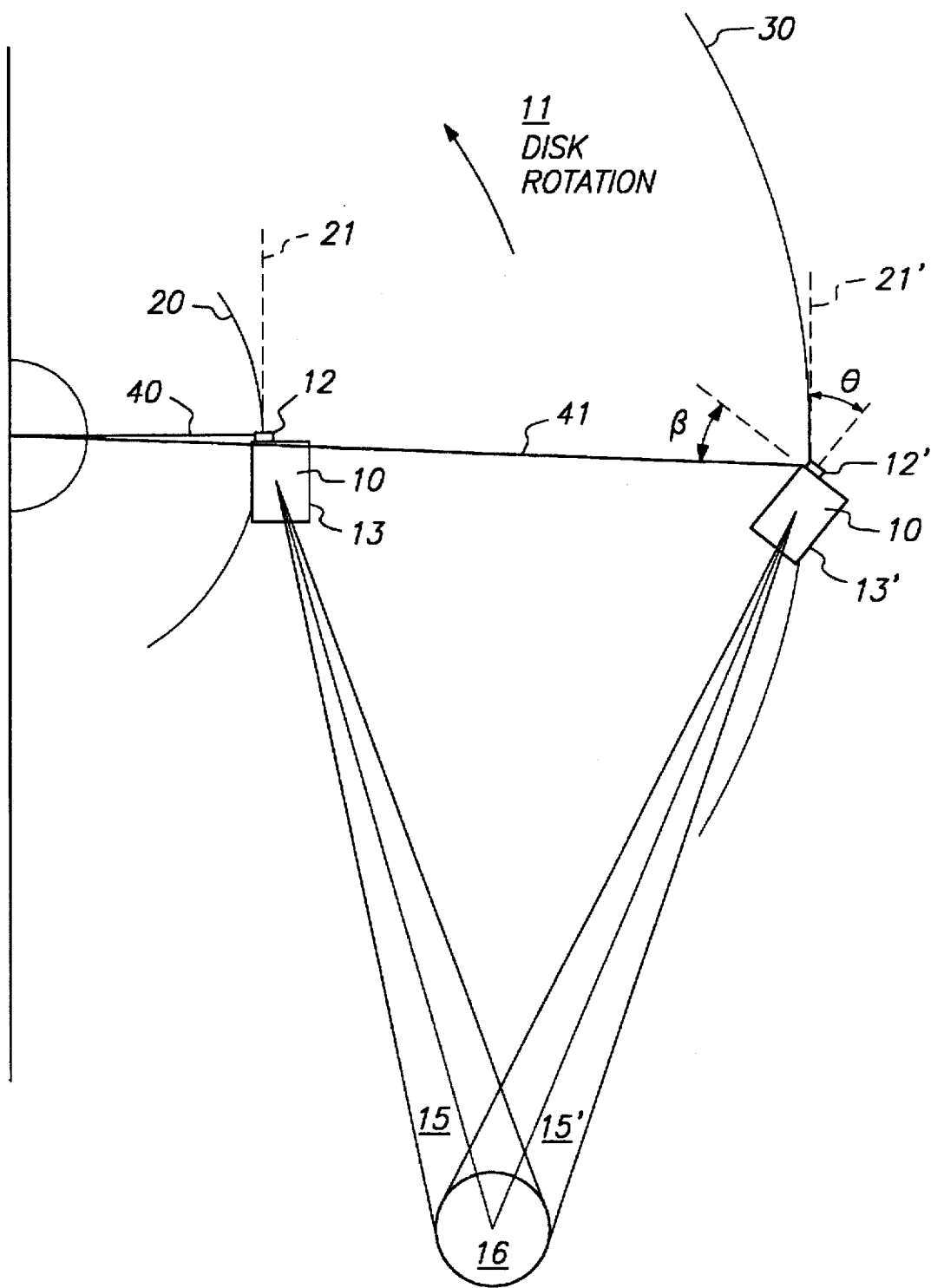
FIG. 1 illustrates a conventional rectangular shaped slider having a severe head gap skew at the outer track and further illustrates the angle defined as the head gap skew angle, $\beta$.
Figures 2A, 2B:
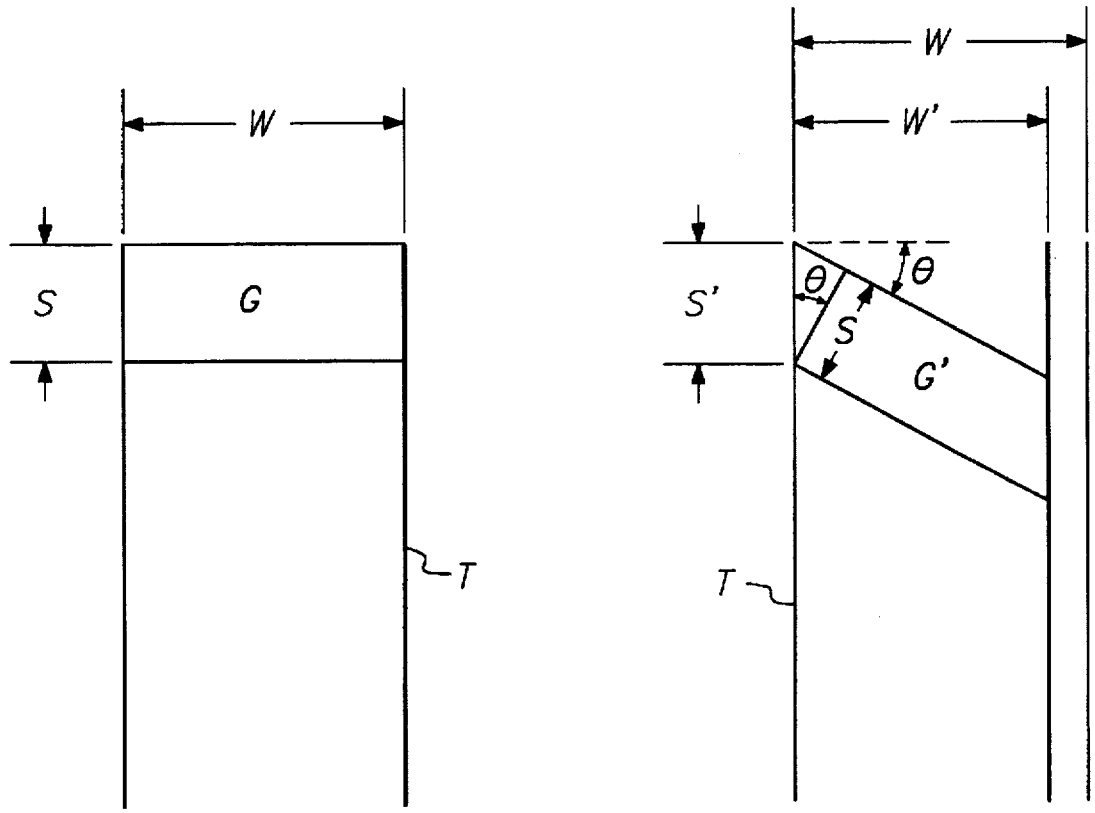
FIG. 2 illustrates the effect of a cosine function of the gap skew angle on the effective track width and transition spacing.
Figure 3:
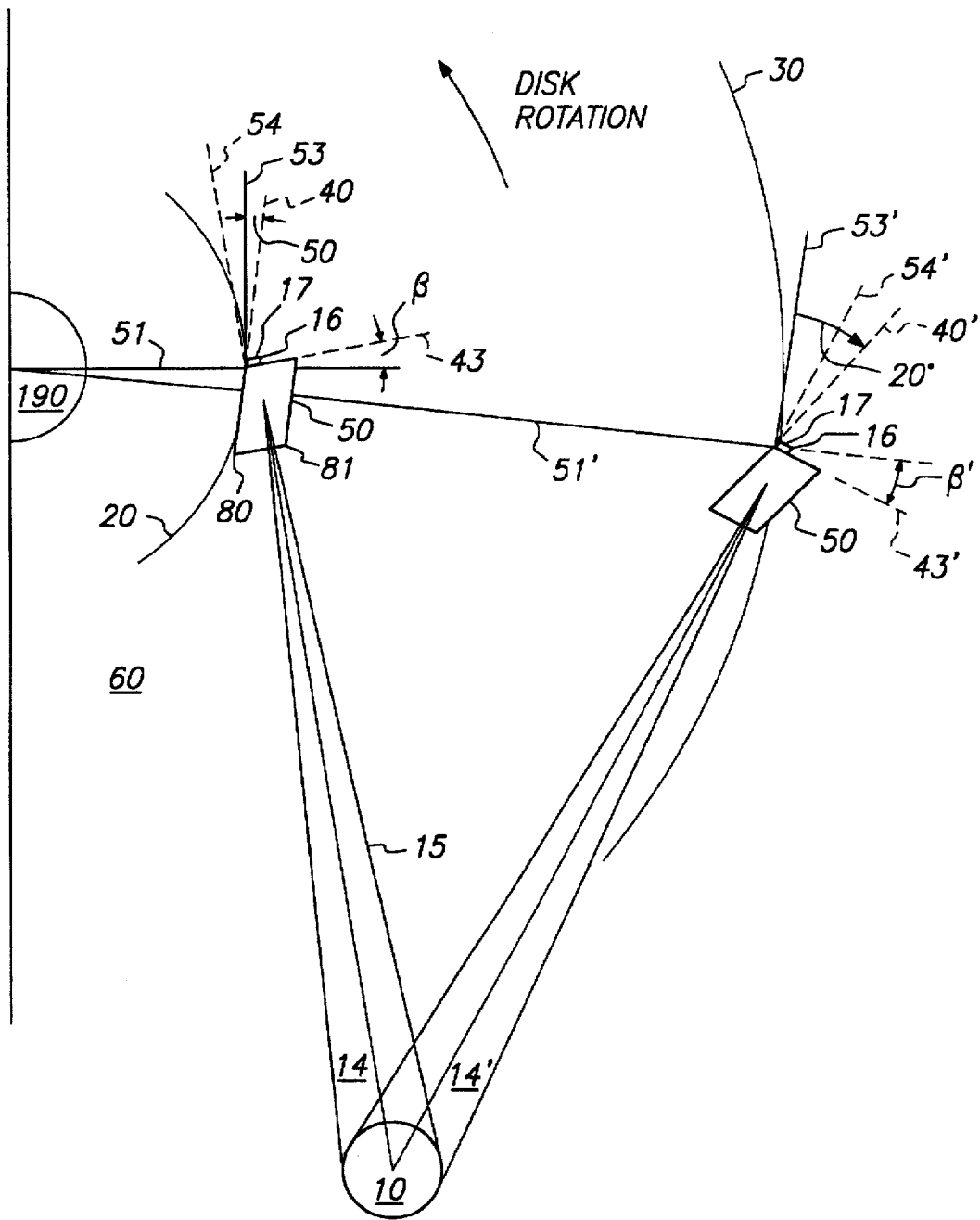
FIG. 3 shows a top plan view of an embodiment of the present invention wherein a parallelogram shaped flying head slider, mounted to a rotary actuator, having a slight counter clockwise (CCW) head gap skew at the innermost track and a slight clockwise (CW) head gap skew at the outermost track.

FIG. 3 shows a top view of a preferred embodiment of the present invention using a new and improved parallelogram shaped slider 50 designed to maximize linear data density at the outer diameter tracks while maintaining a constant low fly height across the surface of the disk. The advantage of the present invention over the prior art is that track density is not increased, thus eliminating the need for a complex head positioner and control circuit to format the disk and control incremental advancement of the head. More importantly, this design is meant to allow for zone bit recording at the maximum possible linear bit density (BPI).

FIG. 3 shows a rotary actuator structure 10 connected to rotate a movable actuator arm 15. The slider 50 is mounted on the arm 15, and a read/write head 16 having a gap 17 is carried by the slider 50. As the disk 60 rotates, the head 16 flies in close proximity to the surface of the disk 60. Two positions of arm 15 are shown. In position 14, head 16 is positioned to transduce at the innermost track 20. In position 14' the head is positioned to transduce at the outermost track 30.

Line 51 represents the disk's radius at the location of the disk's innermost recording track 20 and line 51' represents the disk's radius at outermost track 30.

Tangent lines 53 and 53' of FIG. 3 are tangent to innermost and outermost tracks 20 and 30, respectively. Lines 54 and 54' extend normal to head gap 17 at the location of these two tracks.

Head gap 17 is skewed to disk radii 51 and 51' by the angle β and β' at the location of these two disk tracks, respectively. In the exemplary showing, where the actuator structure 10 is located on the right hand side of disk hub 90, angle β is about −7.5 degrees (i.e. CCW) from the disk radius and angle β' is about +7.5 degrees (i.e. CW) from the disk radius. The corresponding angle, when the head is positioned at the disk's median track (not shown) is about 0 degrees. That is, the head gap is essentially parallel to the disk radius. It should be noted that in an alternative embodiment, angle β may be about +7.5 degrees (i.e. CW) from the disk radius and angle β' may be about −7.5 degrees (i.e. CCW) from the disk radius. The orientation of angles β and β' will depend on factors such as location of the actuator means 10 and direction of disk rotation 13.

Figure 4:
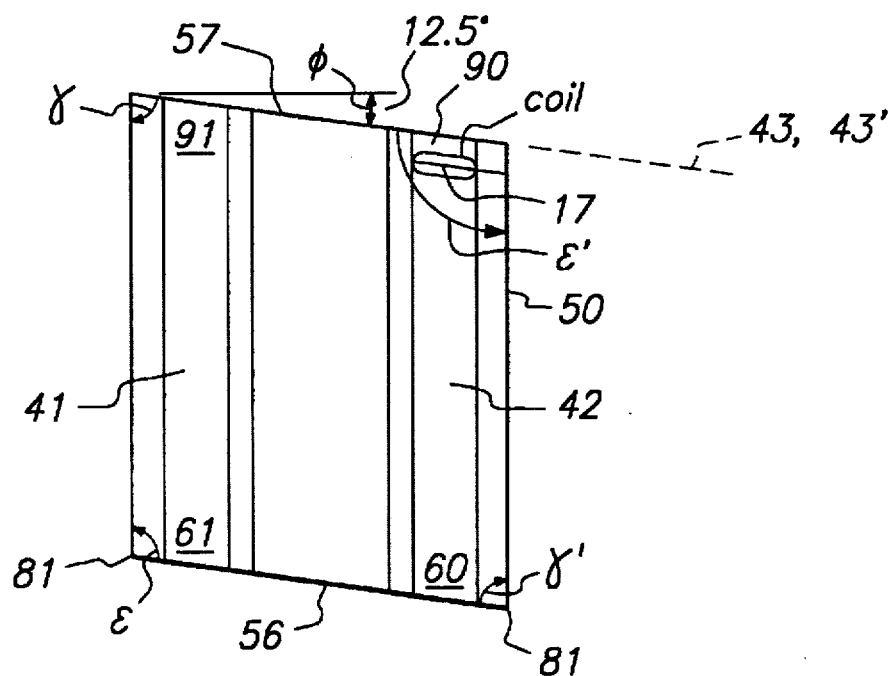
FIG. 4 shows a bottom plan view of the parallelogram shaped slider of FIG. 3.

Lines 40 and 40' of FIG. 3 extend parallel to flying rails 41 and 42 of slider 50, which are shown in FIG. 4. Rails 41 and 42 are oriented about +5 degrees (CW) from tangent line 53 at the location of the innermost track 20 and are oriented about +20 degrees (CW) from tangent line 53' at the outermost disk radius 30. Similar to gap skew angles β and β', in alternative embodiments, rails 41 and 42 may be oriented about −5 degrees (CCW) from tangent line 53 at the location of the innermost track 20 and about −20 degrees (CCW) from the tangent line 53' at the outermost disk radius 30, depending on the location of the actuator structure 10 and direction of disk rotation 13.

Lines 43 and 43', extend from the slider's trailing edge 57 at innermost track 20 and outermost track 30, respectively. The trailing edge 57 is shown in FIG. 4. Lines 43 and 43' are also parallel to head gap 17. The angle between this trailing edge and the radii 51 and 51' varies between −7.5 degrees (CCW) from the disk radius at the innermost track 20, to +7.5 degrees (CW) from the disk radius at the outermost track 30. Again, as with gap skew angles β and β' the angles between the trailing edge and the radii 51 and 51' may be +7.5 degrees (CW) and −7.5 degrees (CCW) from the disk radius at tracks 20 and 30, respectively, depending on the embodiment.

FIG. 4 shows the bottom plan view of the slider 50 shows that the slider is of a generally parallelogram shape (i.e. the side of the slider that faces the disk, shown in FIG. 4 is of a parallelogram shape) having an internal obtuse angles ε and ε' and internal acute angles γ and γ'. This unique shape enables slider 50 to be nearly conventionally fabricated i.e. in groups of rows and columns of heads, where the heads are formed by angled cuts e.g. by gang saws at cut angles, different than the typical 90 degree cuts, in a manner that will be readily understood by those skilled in the art.

Figure 5:
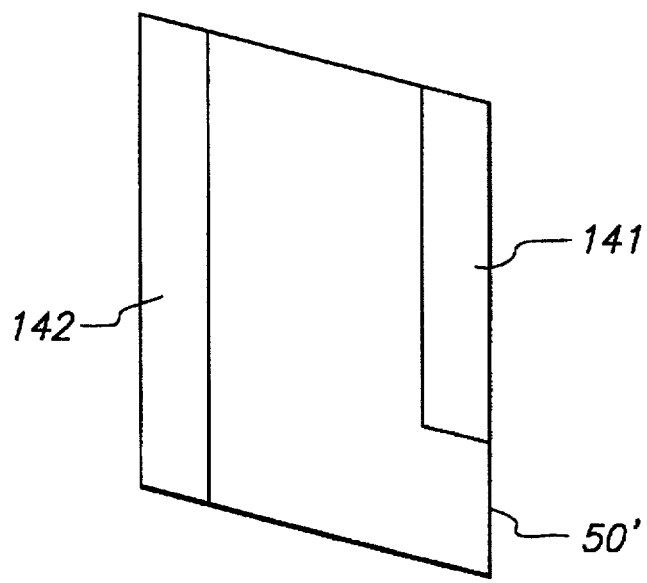
FIG. 5 shows a bottom plan view of an alternative embodiment of the parallelogram slider of FIG. 3.

The slider's two linear flying rails 41 and 42 are generally parallel to each other and may be of generally equal length, as shown in FIG. 4. However, in an alternative preferred embodiment of the present invention, flying rails 41 and 42 may be of unequal length, as shown in FIG. 5 as 141 and 142. The leading ends 60 and 61 of rails 41 and 42 terminate in a generally linear leading edge 56. The trailing ends 90 and 91 of the rails terminate in a generally linear trailing edge 57. The leading/trailing edges 56 and 57 extend at an angle φ of about 12.5 degrees (as measured in the direction of disk rotation) to the direction in which rails 41 and 42 extend. Gap 17 is generally parallel to the slider's leading edge 56 and its trailing edge 57.

In its operating arrangement, the internal obtuse angles ε and ε' and internal acute angles γ and γ' of the slider 50 are fixed such that the average of the cosine of the gap skew angle across the disk is maximized, consequently minimizing the detrimental effects of the skew, while maximizing the rail skew angle at the outer diameter, to maintain a constant low fly height across the disk surface. The track widths are consequently maintained in essentially constant width across the disk 60, as shown in FIG. 3a and illustrated by 65. To fully maximize the data storage capability of the disk, the internal obtuse (ε) and acute (γ) angles of the slider should preferably be set so as to maximize the average of the cosine of the gap skew angle across the disk while maintaining an essentially constant low fly height. In the embodiment illustrated in FIG. 3, the leading inside corner 80 is located in advance of the leading outside corner 81 at the inner diameter track and the inverse occurs at the outer diameter track. It should be noted that it is this particular parallelogram shaped slider and it's mounted orientation, relative to the disk, which enables the linear data density to be increased without increasing track density at the outer diameter tracks.

It should also be noted that the variation that occurs in the skew of the head gap to disk radii and the skew of the slider rail to the tangential velocity vector is composed of two components. The first component is the direct angular rotation of the slider 50 by virtue of rotation of rotary actuator structure 10. The second component, which is indirectly produced by actuator rotation, is due to a change in the angle of the disk radius that extends through the slider 50 at the location of each disk track.

Those skilled in the art, when faced with the design of a disk file of a particular geometry, will readily find that the present invention can be applied to the particular geometry by making use of the effects of these two component to thereby provide the needed gap and rail rotation or skew as the slider moves across the disk.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and description herein are purely illustrative and are not intended to be in any sense limiting.

What is claimed is:

1. A method for increasing data density on a magnetic storage disk without increasing track density, the disk having a plurality of recording tracks, including an innermost track and an outermost track, each of the tracks having a same width and a radius defined between a disk center and the track, the method comprising the steps of:

providing a generally parallelogram shaped slider having generally parallel flying rails, the slider being defined by two parallel side edges, a leading edge and a trailing edge, the side edges and the trailing edge defining an obtuse and acute internal angle;

locating a head gap along the trailing edge;

setting the obtuse and acute internal angles such that the head gap skews in a counterclockwise (CCW) angle from the radius at the innermost track and a clockwise (CW) angle from the radius at the outermost track as viewed from above the disk;

mounting the generally parallelogram shaped slider to a rotary actuator for positioning the slider between the innermost track and the outermost track through an arcuate path; and maintaining a substantially constant track-to-track spacing as the head moves between the innermost track to the outermost track.

2. The method of claim 1 further comprising the step of setting the oblique and acute internal angles such that the head gap skews at a counterclockwise angle of about 7.5 degrees from the radius at the innermost track, as viewed from above the disk.

3. The method of claim 1 further comprising the step of setting the counterclockwise angle at the innermost track and the clockwise angle at the outermost track such that the trailing edge is substantially parallel to the radius at a median track defined half way between the outermost track and the innermost track.

4. The method of claim 1 further comprising the step of setting the flying rails of the parallelogram shaped slider to unequal lengths.

5. The method of claim 1 further comprising the step of setting the obtuse and acute internal angles such that the head gap skews at a clockwise angle of approximately 7.5 degrees from the radius at the outermost track, as viewed from above the disk.

6. A magnetic disk drive apparatus for increasing recording density comprising:

a magnetic recording disk having a plurality of tracks including an innermost track and an outermost track, each of the tracks having a width and a radius defined between a disk center and the track;

means for rotating the disk;

a slider mounting means to position a slider between the innermost track and the outermost track a read/write head carried by the slider and flying at a substantially constant fly height above a storage surface of the disk, and maintaining a substantially constant track-to-track spacing as the head moves between the innermost track and the outermost track, the head having a generally linear recording head gap;

a generally parallelogram shaped slider carrying the read/write head, the parallelogram shaped slider defined by a pair of parallel side edges, a leading edge and a trailing edge the side edges and the trailing edge defining an obtuse angle and an acute angle, the leading edge further defined by an inside leading corner and an outside leading corner, the head gap being located along the trailing edge, between the side edges, and skewed in a counterclockwise angle from the radius at the innermost track and a clockwise angle from the radius at the outermost track as viewed from above the disk; and the inside leading corner of the parallelogram shaped slider being located in advance of the outside leading corner, away from the direction of disk rotation, when the slider is positioned at the innermost track and the outside leading corner of the parallelogram shaped slider is located in advance of the inside leading corner, away from the direction of disk rotation, when the slider is positioned at the outermost track, as viewed from above the disk.

7. The magnetic disk drive apparatus of claim 6 wherein the parallelogram shaped slider further having a plurality of generally parallel flying rails, each having a length of unequal dimension.

8. The magnetic disk drive apparatus of claim 6 wherein the head gap skews at a counterclockwise angle of approximately 7.5 degrees from the radius at the innermost track.

9. The magnetic disk drive apparatus of claim 6 wherein the head gap skews at a clockwise angle of approximately 7.5 degrees from the radius at the outermost track.

10. The magnetic disk drive apparatus of claim 6 wherein the head gap skews at a clockwise angle of approximately 7.5 degrees from the radius at the outermost track, as viewed from above the disk.

11. The magnetic disk drive apparatus of claim 6 wherein the head gap skews at a counterclockwise angle of approximately 7.5 degrees from the radius at the innermost track, as viewed from above the disk.

12. The magnetic disk drive apparatus of claim 6 wherein the head gap is substantially parallel to the radius at a track defined half way between the outermost track and the innermost track.

13. A method of increasing data density in zone bit recording on a magnetic recording disk, the disk having a plurality of recording tracks, including an innermost track and an outermost track, each of the tracks having a width and a radius defined between a disk center and the track, the method comprising the steps of:

rotating the disk;

providing a generally parallelogram shaped slider having generally parallel flying rails, the slider being defined by a pair of parallel side edges, a leading edge, a trailing edge, and an obtuse and acute internal angle defined along the trailing edge;

providing a read/write head having a generally linear recording head gap and being carried by the slider along the trailing edge;

setting the obtuse and acute internal angles of the parallelogram shaped slider to cause the head gap to skew in a counterclockwise (CCW) angle from the radius at the innermost track and a clockwise (CW) angle from the radius at the outermost track as viewed from above the disk;

mounting the generally parallelogram shaped slider to a rotary actuator for moving the slider between the innermost track and the outermost track through an arcuate path;

flying the read/write head in close proximity to a storage surface of the disk and at a substantially constant fly height across the disk;

maintaining a substantially constant track-to-track spacing across the disk; and arranging a leading inside corner defined along the leading edge and an outside leading corner defined along the leading edge, opposite the leading inside corner, so that the leading inside corner is located in advance of the outside leading corner, away from the direction of disk rotation, when the slider is positioned at the innermost track and the outside leading corner is located in advance of the inside leading corner, away from the direction of disk rotation, when the slider is positioned at the outermost track, as viewed from above the disk.

14. The method of claim 1 wherein the head gap skews at a clockwise angle of approximately 7.5 degrees from the radius at the outermost track, as viewed from above the disk.

15. A method for increasing data density on a magnetic storage disk without increasing track density, the disk having a plurality of recording tracks, including an innermost track and an outermost track, each of the tracks having a same width and a radius defined between a disk center and the track, the method comprising the steps of:

providing a generally parallelogram shaped slider defined by a pair of parallel side edges, a leading edge and a trailing edge, the pair of side edges and the trailing edge further defining an obtuse and acute internal angle;

locating a recording head gap on the slider along the trailing edge;

setting the obtuse internal angle to approximately 102.5 degrees and the acute internal angle to approximately 77.5 degrees, as viewed from above the disk;

mounting the generally parallelogram shaped slider to a rotary actuator such that the head gap skews in a counterclockwise (CCW) angle from the radius at the innermost track, a clockwise (CW) angle from the radius at the outermost track and such that the head gap is parallel at a median track defined between the innermost and outermost tracks, as viewed from above the disk; and maintaining a substantially constant track-to-track spacing as the head moves between the innermost track to the outermost track.

* * * * *